United States Patent

Sorensen et al.

[11] Patent Number: 5,846,473
[45] Date of Patent: Dec. 8, 1998

[54] REMOVAL OF INJECTION-MOLDED TIE FROM MOLD BY TEMPORARILY RETAINING CORE BETWEEN PAWL AND ABUTMENT SURFACE OF TIE

[75] Inventors: Soren Christian Sorensen; Jens Ole Sorensen, both of Cayman Kai, Cayman Islands

[73] Assignee: GB Electrical, Inc., Milwaukee, Wis.

[21] Appl. No.: 584,686

[22] Filed: Jan. 8, 1996

[51] Int. Cl.⁶ .................................................. B29C 45/44
[52] U.S. Cl. ...................... 264/318; 24/17 AP; 264/334; 425/556; 425/438; 425/DIG. 58
[58] Field of Search ..................................... 264/318, 334, 264/336, 328.1; 425/556, 577, 438, DIG. 58; 249/63, 64, 66, 98, 101; 24/17 AP

[56] References Cited

U.S. PATENT DOCUMENTS

| | | | |
|---|---|---|---|
| 2,744,288 | 5/1956 | Fienberg et al. | 425/438 |
| 2,875,472 | 3/1959 | Marcus | 425/DIG. 58 |
| 3,660,869 | 5/1972 | Caveney et al. | 24/16 PB |
| 3,915,613 | 10/1975 | Ruch | 425/DIG. 58 |
| 3,924,299 | 12/1975 | McCormikck | 24/16 PB |
| 3,940,103 | 2/1976 | Hilaire | 425/438 |
| 4,125,246 | 11/1978 | Von Holdt | 425/438 |
| 4,473,524 | 9/1984 | Paradis | 264/291 |
| 5,146,654 | 9/1992 | Caveney et al. | 24/16 PB |
| 5,389,330 | 2/1995 | Sorensen et al. | 264/328.1 |

*Primary Examiner*—Jill L. Heitbrink
*Attorney, Agent, or Firm*—Edward W. Callan

[57] ABSTRACT

A method of injection molding a tie that includes an abutment wall surface having at least one tooth facing a pawl that has at least one tooth inside a locking head utilizes a core that defines at least a portion of the abutment surface tooth and at least a portion of a surface of the pawl that includes the at least one pawl tooth. The core is movable in relation to a first other mold part and is separated from a second other mold part not sooner than the first other mold part is separated from the second other mold part to thereby enable (a) the pawl to flex into a space vacated by movement of the first other mold part and (b) the abutment wall to flex into a space also vacated by movement of the first other mold part during separation of the first other mold part from the second other mold part so that the tie can be removed from the mold without significantly damaging either the at least one pawl tooth or the at least one abutment surface tooth.

6 Claims, 1 Drawing Sheet

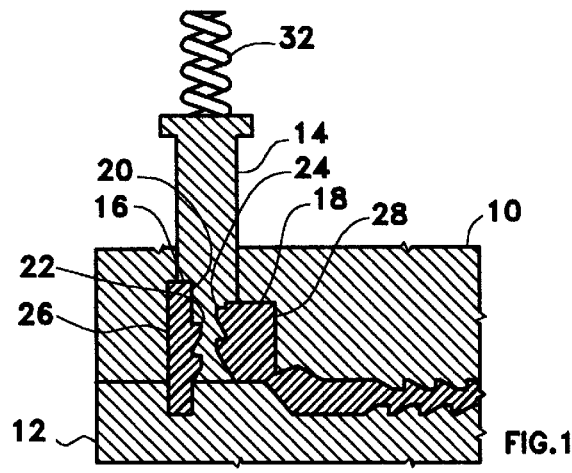
FIG.1
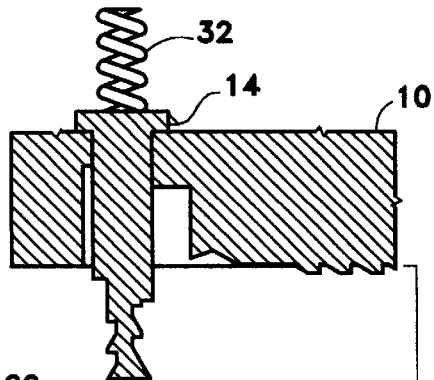
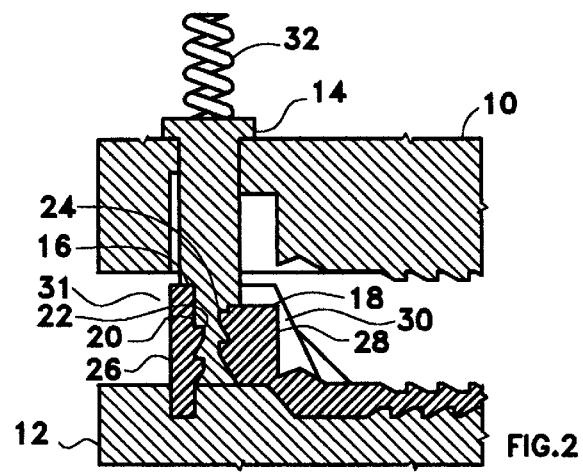
FIG.2
FIG.3
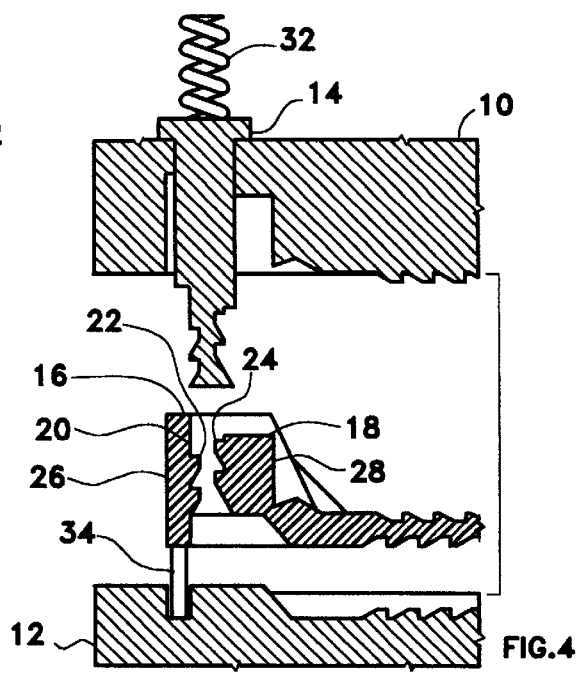
FIG.4

REMOVAL OF INJECTION-MOLDED TIE FROM MOLD BY TEMPORARILY RETAINING CORE BETWEEN PAWL AND ABUTMENT SURFACE OF TIE

The present invention generally pertains to injection molding of a tie that is useful for forming a loop for retaining a bundle of elongated articles, such as cables. Such a tie is commonly known as a cable tie. The present invention is particularly directed to removal from the mold of a tie having at least one tooth on an abutment surface in the locking head of the tie.

One type of tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl. Such a tie is described in U.S. Pat. No. 4,473,524 to Paradis.

A prior art method of injection molding such a tie includes the steps of:

(a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold.

When such a tie is formed by injection molding, it is difficult to remove the tie from the mold without significantly damaging the at least one tooth on the abutment surface unless the apex of the tooth is defined at a parting line between mold parts because the portion of the mold part that defines the abutment surface has a lateral dimension that is broader than the space between such tooth and the pawl, whereby withdrawal of such mold part from a parting line between mold parts compresses and thereby distorts such tooth.

SUMMARY OF THE INVENTION

The present invention provides a method of injection molding a tie, wherein the tie is removed from the mold without significantly damaging the at least one tooth on the abutment surface.

The present invention is a method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes first and second, and a core that is movable within the first mold part defining a cavity between the mold parts in the general shape of the tie when the core is not retracted;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said core that defines at least a portion of the abutment surface that includes the at least one abutment surface tooth and at least a portion of the pawl that includes the at least one pawl tooth; and providing a said first mold part that defines at least a portion of the opposite side of the abutment wall from the abutment surface and at least a portion of the opposite side of the pawl from the at least one pawl tooth; and wherein step (d) comprises the step of (f) separating the core from the second mold part after the first mold part is separated from the second mold part to thereby enable both the abutment wall and the pawl to flex into space vacated by movement of the first mold part during separation of the first mold part from the second mold part so that the tie can be removed from the mold pursuant to step (e) without significantly damaging either the at least one abutment surface tooth or the at least one pawl tooth.

Additional features of the present invention are described with reference to the detailed description of the preferred embodiments.

BRIEF DESCRIPTION OF THE DRAWING

FIG. 1 is sectional view illustrating formation of the abutment wall and the pawl portions of a tie in a mold utilized in a preferred embodiment of the injection molding method of the present invention.

FIG. 2 is sectional view illustrating relative separation of the mold parts shown in FIG. 1 at one stage of a preferred embodiment of the method of the present invention.

FIG. 3 is sectional view illustrating further relative separation of the mold parts shown in FIG. 1 at a stage in the preferred embodiment of the method of the present invention subsequent to the stage shown in FIG. 2.

FIG. 4 is sectional view illustrating ejection of the tie from the second mold part subsequent to the stage in the preferred embodiment of the method shown in FIG. 3.

DETAILED DESCRIPTION

Referring to FIG. 1, in a preferred embodiment of the method of the present invention, a tie of the type described above is injection molded in a mold including a first mold part 10, a second mold part 12 and a core mold part 14. When the mold is closed, as shown in FIG. 1, the first mold part 10, the second mold part 12 and the core mold part 14 define a cavity therebetween in the general shape of the tie, which includes an abutment wall 16 having an abutment surface 20 and a pawl 18. An abutment surface 20 of the abutment wall 16 includes at least one tooth 22 facing the pawl 18; and the pawl 18 includes at least one tooth 24 facing the abutment wall 16. The first mold part 10 defines at least a portion of a surface 26 of the abutment wall 16 that is on the opposite side of the abutment wall 16 from the portion of the abutment surface 20 that includes the at least one abutment surface tooth 22 and at least a portion of the side 28 of the pawl 18 that is opposite the side of the pawl 18 that includes the at least one pawl tooth 24. The first mold part 10 and the core mold part 14 are movable in relation to each other. When the mold is closed, the first mold part 10 joins the second mold part 12 at a parting line P.L. and the core mold part 14 also joins the second mold part 12 at the parting line P.L.

The core mold part 14 is disposed when the mold is closed for defining at least a portion of the abutment surface 20 that includes the at least one abutment surface tooth 22 and at least a portion of the pawl 18 that includes the at least one pawl tooth 24.

Molten plastic material is injected into the mold cavity and solidified therein to form the tie.

Referring to FIG. 2, the core mold part 14 is separated from the second mold part 12 not sooner than the first mold part 10 is separated from the second mold part 12 to thereby enable (a) the pawl 18 to flex into a space 30 vacated by movement of the first mold part 10 and (b) the abutment wall 16 to flex into a space 31 also vacated by such movement of the first mold part 10 during separation of the first mold part 10 from the second mold part 12 so that the tie can be removed from the mold without significantly damaging either the at least one pawl tooth 24 or the at least one abutment surface tooth 22. The first mold part 10 is separated from the second mold part 12 in a direction normal to at least a portion of the parting line P.L. Preferably, the core mold part 14 remains in contact with the second other mold part until the first other mold part has moved to vacate both the space 30 into which the pawl 18 thereby is able to flex. and the space 31 into which the abutment wall 16 thereby is able to flex. The core mold part 14 is retained in contact with the second mold part 12 by a spring 32 while the first mold part 10 is initially separated from the second mold part 12. In alternative embodiments (not shown) compressed air, hydraulic pressure or the mere grip of the core mold part 14 between the at least one abutment surface tooth 22 and the at least one pawl tooth 24 is used to retain the core mold part 14 in contact with the second mold part 12 while the first mold part 10 is being separated from the second mold part 12.

Referring to FIG. 3, as the first mold part 10 is further separated from the second mold part 12, the core mold part 14 is separated from the second mold part 12 while the tie is retained in the second mold part 12, whereupon the pawl flexes into the space 30 and the abutment wall flexes into the space 31 and the tie is removed from the core mold part 12 without significantly damaging either the at least one pawl tooth 24 or the at least one abutment surface tooth 22.

Referring to FIG. 4, the tie is ejected from the second mold part 12 by protraction of a pair of ejector pins 34.

In an alternative embodiment (not shown), the tie is retained on the core mold part 14 when the core mold part 14 is separated from the second mold part 12; and the tie is then ejected from the core mold part 14 by protraction of a pair of ejector pins.

When hydraulic pressure or compressed air is used to retain the core mold part 14 in contact with the second mold part 12 during separation of the first mold part 10 from the second mold part 12, variation of such hydraulic pressure or compressed air can be used to retract the core mold part 14 before or during ejection of the tie so that the tie does not become caught by or entangled with the protracted core mold part 14.

The method described herein enables injection molding of a tie in which the free end of the pawl 18 is relatively thick between the side of the pawl 18 that includes the at least one pawl tooth 24 and the side 28 of the pawl 18 that is opposite the side of the pawl that includes the at least one pawl tooth 24, as shown in the Drawing. As a result one is able to injection mold a tie in which the free end of the pawl is of such thickness that the pawl is strong enough to resist bending when a high pulling force is applied to the pawl in a direction opposite to the direction of insertion while the pawl is engaged with the first set of ratchet teeth so that the pawl may not be bent to such an extent that the pawl becomes disengaged from the first set of ratchet teeth and enables the tongue to become unlocked from the locking head. This aspect of the method described herein is the subject of a separate patent application being filed on even date herewith.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. A method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes first and second mold parts and a core that is movable within the first mold part for defining a cavity between the mold parts in the general shape of the tie when the core is not retracted;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said core that defines at least a portion of the abutment surface that includes the at least one abutment surface tooth and at least a portion of the pawl that includes the at least one pawl tooth; and providing a said first mold part that defines at least a portion of the opposite side of the abutment wall from the abutment surface and at least a portion of the opposite side of the pawl from the at least one pawl tooth; and wherein step (d) comprises the step of (f) separating the core from the second mold part after the first mold part is separated from the second mold part to thereby enable both the abutment wall and the pawl to flex into space vacated by movement of the first mold part during separation of the first mold part from the second mold part so that the tie can be removed from the mold pursuant to step (e) without significantly damaging either the at least one abutment surface tooth or the at least one pawl tooth.

2. A method according to claim 1, wherein during step (f) the core remains in contact with the second mold part until the first mold part has moved to vacate the space into which the abutment wall thereby is able to flex.

3. A method according to claim 2, wherein during step (f), after the first other mold part has moved to vacate said space, the first mold part is further separated from the second mold part and the core is separated from the second mold part while the tie is retained in the second mold part.

4. A method according to claim 3, wherein the first and second mold parts are joined at a parting line and step (d) comprises separating the first and second mold parts in a direction normal to the parting line.

5. A method according to claim 2, wherein the first and second mold parts are joined at a parting line and step (d) comprises separating the first and second mold parts in a direction normal to the parting line.

6. A method according to claim 1, wherein the first and second mold parts are joined at a parting line and step (d) comprises separating the first and second mold parts in a direction normal to the parting line.

* * * * *